Nov. 1, 1938.  A. P. DE SEVERSKY  2,135,464

AIRCRAFT WING STRUCTURE

Filed June 29, 1935  2 Sheets-Sheet 1

INVENTOR
Alexander P. de Seversky
BY
Maurice B. Landau
ATTORNEY

Nov. 1, 1938.  A. P. DE SEVERSKY  2,135,464
AIRCRAFT WING STRUCTURE
Filed June 29, 1935   2 Sheets-Sheet 2
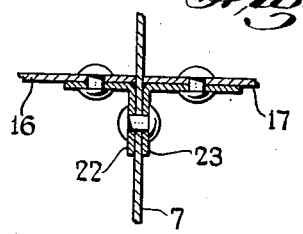
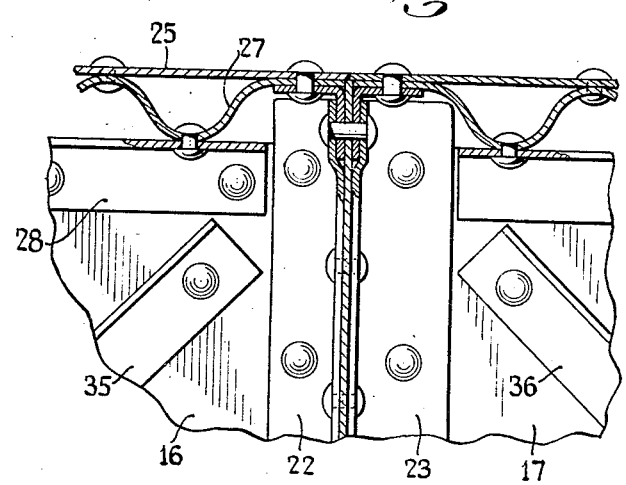
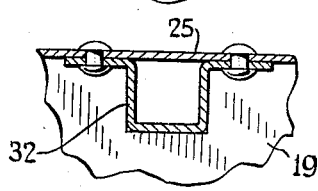
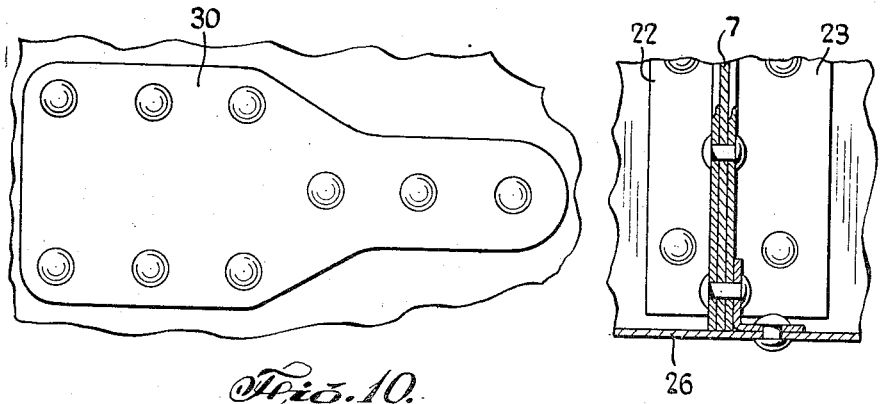
INVENTOR
Alexander P. de Seversky
BY
ATTORNEY Patented Nov. 1, 1938

2,135,464

UNITED STATES PATENT OFFICE 2,135,464

AIRCRAFT WING STRUCTURE

Alexander P. de Seversky, New York, N. Y.

Application June 29, 1935, Serial No. 29,123

1 Claim. (Cl. 244—123)

The present invention relates to aircraft and has for an object to provide an improved wing structure.

The invention aims to provide a structure of maximum strength with minimum weight and also one which can be manufactured efficiently and economically while requiring the minimum of special equipment.

A preferred embodiment comprises a cellular frame with a sheet metal sheathing secured thereto to form a complete rigid wing. The structure and method of fabrication are such that relatively small sections which can be conveniently handled are fabricated as separate units and then assembled to form a complete wing. These separate sections are small and of such design that the webs, angle bars and at least a part of the sheathing can be riveted together on a riveting machine of standard construction.

Figure 1:
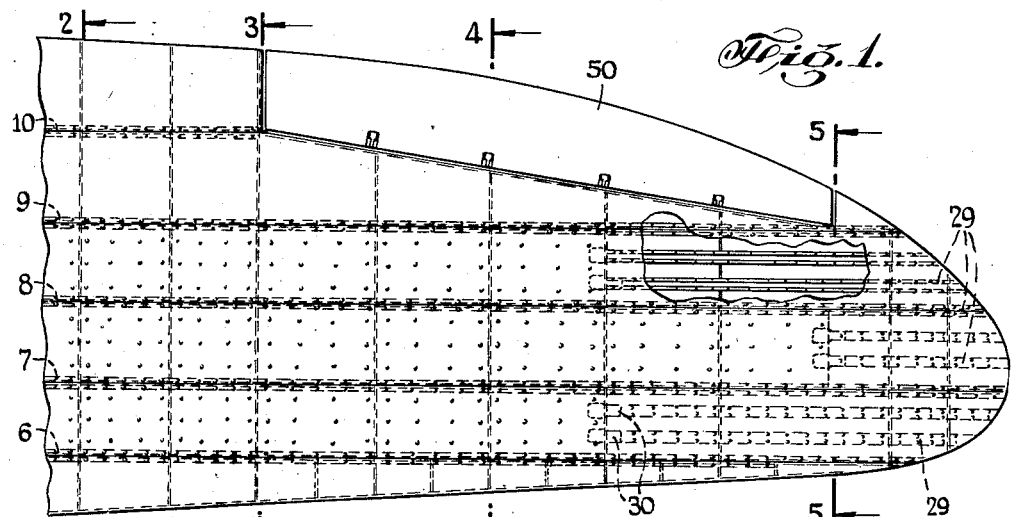

The nature and objects of the invention will be better understood from a description of a particular illustrative embodiment for the purposes of which description reference should be had to the accompanying drawings forming a part hereof and in which:

Figure 1 is a plan view of a wing embodying the invention;

Figs. 2, 3, 4 and 5 are sectional views taken respectively on the lines 2—2, 3—3, 4—4 and 5—5 of Fig. 1;

Figs. 6 to 9 inclusive are detailed views showing joint structures, and

Fig. 10 is a detail view showing a connecting plate.

The two wings of the aircraft are preferably formed as one continuous unitary structure, the parts shown in Fig. 1 constituting the major part of one wing and nearly half of the complete wing structure. The wing shown is built up entirely of aluminum comprising a cellular structure with top and bottom sheathing securely riveted thereto. The cellular structure comprises vertical longitudinal ribs extending the length of the wing and vertical transverse webs extending from the front to the rear edge of the wing. The webs, however, are not necessarily continuous but may be built up of suitable lengths secured together by vertical angle members.

Figure 2:
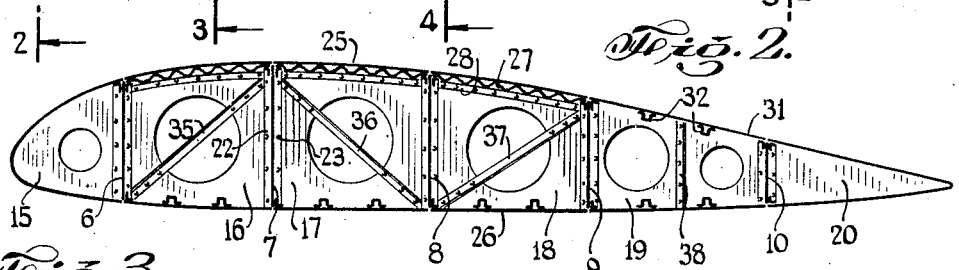

Referring more specifically to the drawings the longitudinal webs may, if desired, be continuous for the full length of the two wings but ordinarily it is more convenient for manufacture if they are made in sections abutting each other at certain of the joints at which they are connected to transverse webs. These longitudinal webs are indicated at 6 to 10 inclusive. Figure 2 illustrates an arrangement in which the transverse webs are made in separate panels as indicated at 15 to 20 inclusive. A typical joint between the transverse and longitudinal webs is illustrated in Figs. 6 and 7. The two adjacent ends of the web members 16 and 17 abut against the opposite faces of the web member 7, and vertical angle bars 22, 23 fit against and are riveted to the web members to form a rigid joint.

The top of the cellular structure formed by the transverse and longitudinal webs is covered with a metal sheathing 25 and the bottom with the sheathing 26.

When we consider the airplane wing as a cantilever beam it will be obvious that the top sheathing is in compression and the bottom sheathing in tension. Treating the top sheathing then as a compression strut member advantage is gained, according to the present invention, by reinforcing the strut member with a corrugated sheet 27 which because of its shape provides a very rigid structure of light weight.

As best indicated in Figs. 2 and 7, the corrugated reinforcing members are secured to the transverse web members by riveting the same to the angle bars 28 carried by the web members 16, 17, 18 and to the other similar members of other sections. This sheathing extends along the major portion of the length of the wing while beyond the end of this, channel members 29 extend to the end of the wing. These channel members are rigidly connected to the corrugated sheet by connecting plates 30 riveted to the channel members and to the corrugated sheathing as best shown in Fig. 10. The corrugated reinforcement extends over the three middle sections of which the web members 16, 17 and 18 of Fig. 2 form a part. Toward the rear of the wing the surface sheet 31 is sufficiently reinforced by spaced channel members 32 which are sufficient to prevent buckling of the sheet. The more effective reinforcement as provided by the corrugated metal is not usually necessary at the rear edge and end of the wing.

The manufacture of the wing is greatly facilitated if it can be made in sections which are small enough for convenient handling and of such shape that they may be riveted in a standard riveting machine With this in mind the wing structure shown is designed to be made in separate sections which meet on the planes of the webs 6, 7, 8, 9, and 10 Each section is a complete unitary structure and can be fabricated separately, leaving relatively few rivets to be driven when the sections are assembled. Referring to the structure of Fig 2, for example, the plane at this point of its length may consist of six sections from front to back. The top sheathing accordingly is in separate pieces, meeting at the planes of the several webs 6, 7, 8 etc The corrugated reinforcement is also in three sections transversely of the wing in accordance with the same plan The bottom sheathing may also be similarly sectional, but ordinarily it is more convenient for purposes of assembling to leave the bottom face of the wing open until all of the other parts are assembled and then to apply the bottom sheathing separately. When this is done it may be made up in sections terminating at the webs 6, 7, 8 etc., or in larger sections even to the extent of forming the complete length from front to back of one single sheet. In such case the width of the sheets longitudinally of the wing would be determined by the availability of wide sheets and the convenience of handling as well as by the curvature of the surface.

The longitudinal sections may be divided longitudinally as desired, that is to say the sections as fabricated may be of convenient lengths shorter than the full length of the wing as may be found convenient and desirable. Connections between the ends of longitudinal sections may be made by overlapping the ends of the sheathing or by abutting the ends and introducing additional vertical angle bars.

Figure 3:
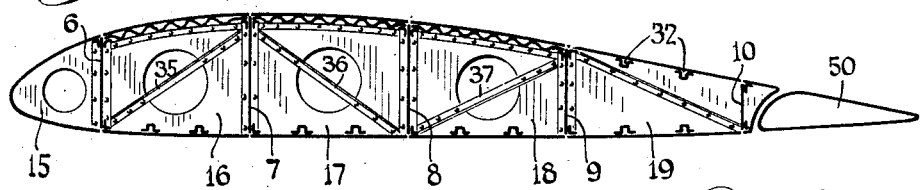
Figure 4:
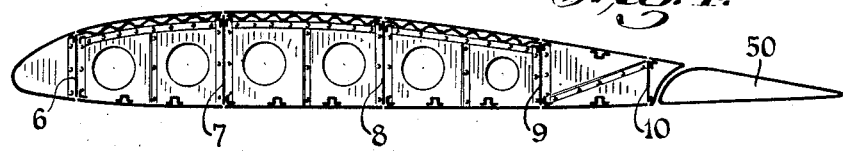
Figure 5:
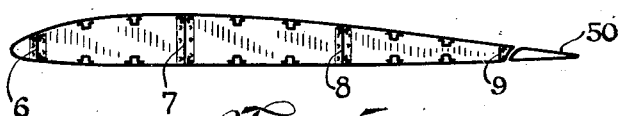

A certain amount of weight is saved by cutting away the web members centrally of each cellular section. This is illustrated in Figs. 2, 3 and 4 where circular holes in the webs are shown. These web members, however, are preferably reinforced by angle members 35, 36, and 37 as shown in Fig. 2 and other similar members on the other transverse and longitudinal web sections. The web member 19 is reinforced by a vertical angle member 38.

The aileron 50 is of similar construction to the wing and need not be more specifically described.

The foregoing particular description is illustrative merely and is not intended as defining the limits of the invention.

I claim:

In an airplane wing-structure, a plurality of separately-prefabricated units each comprising a top sheathing and a bottom sheathing connected by vertical webbing extending parallel to the direction of flight and each being open at its front face and its rear face, said units meeting on separate vertical webs extending longitudinally of the wing and having vertical angle-members serving as means for connection between meeting units, the units thus constituting the wing multicellular from leading-edge to trailing-edge and from tip to root, no single one of said united units carrying even the major portion of the wing-loading, and the webs which extend parallel to the direction of flight carrying vertical and diagonal angles constituting chordwise trussing between the longitudinal webs, whereby the majority of the number of said webs extending parallel to the flight-direction, in disconnected locations, may be destroyed and all of said longitudinally-extending webs except any two may be destroyed, without thereby destroying the integrity of the wing itself.

ALEXANDER P. de SEVERSKY.